June 20, 1961  C. J. EDWARDS, JR  2,988,863
COTTON PICKING MACHINE

Filed Feb. 11, 1959  4 Sheets-Sheet 1

INVENTOR.
CYRIL J. EDWARDS, JR.
BY Gregory S. Dolgorukov
ATTORNEY

June 20, 1961 C. J. EDWARDS, JR 2,988,863
COTTON PICKING MACHINE

Filed Feb. 11, 1959 4 Sheets-Sheet 3

INVENTOR.
CYRIL J. EDWARDS, JR.
BY
Gregory S. Dolgorukov
ATTORNEY

June 20, 1961 C. J. EDWARDS, JR 2,988,863
COTTON PICKING MACHINE
Filed Feb. 11, 1959 4 Sheets-Sheet 4

INVENTOR.
CYRIL J. EDWARDS, JR.
BY
Gregory S. Dolgorukov
ATTORNEY

United States Patent Office 2,988,863
Patented June 20, 1961

2,988,863
COTTON PICKING MACHINE
Cyril J. Edwards, Jr., 35 McKinley Road,
Grosse Pointe Farms 36, Mich.
Filed Feb. 11, 1959, Ser. No. 792,499
13 Claims. (Cl. 56—30)

This invention relates to cotton picking machines. The subject-matter of the present application is an improvement in the cotton picker disclosed in my co-pending application Serial No. 687,748, filed on October 2, 1957, for Cotton Picker.

Strenuous search for providing a machine for picking cotton has been going on for almost a century. Yet, in spite of numerous attempts to produce an efficient, simple and inexpensive cotton picking machine, no machine fully satisfying the small farmers' practical requirements for such a machine has yet been produced.

A small cotton farmer still does not have available to him a simple, relatively inexpensive machine that would pick his cotton thoroughly and cleanly enough, i.e. without leaving too much unpicked cotton in the field and without having so much trash in the picked cotton as to cause its downgrading at the receiving point. Therefore, picking cotton by hand still remains the most universally used method of cotton picking on smaller plantations or farms.

One of the objects of the present invention is to provide a cotton picker or cotton picking machine which is based on a novel concept which provides for constructing a simple and practical cotton picking machine.

Another object of the present invention is to provide an improved cotton picker or cotton picking machine comprising, generally, a cotton boll feeding unit and a cotton fibers separating unit, with said units being usable in combination with each other, or separately in combination with units of other construction but having complementary functions and operating to produce desired results.

A further object of the present invention is to provide a cotton picker or cotton picking machine which includes a boll feeding unit adapted to bring cotton bolls in contact with the cotton fibers separating unit without feeding foliage or branches of the cotton plant into the separating unit in a manner that might cause engagement of such foliage and its separation from the plant and possible mixing with the cotton.

A still further object of the present invention is to provide a cotton picker or cotton picking machine comprising a boll feeding unit and a cotton separating unit having means engaging the cotton fibers as they are brought in contact with the separating means by the boll feeding unit, with the engagement of cotton fibers by separating means being sufficient as to its strength and duration to ensure separation of the cotton fibers when the same are made to move relative to the burr or hull.

It is added object of the present invention to provide a cotton picker or cotton picking machine of the nature specified above, which is relatively simple in construction, dependable in operation and is relatively inexpensive to manufacture and to service.

Further objects and advantages of this invention will be apparent from the following description and appended claims, reference being had to the accompanying drawings forming a part of this specification, wherein like reference characters designate corresponding parts in the several views. It shall be understood that the drawings herein, containing the views described below, are diagrammatic in their nature with some parts of the cotton picker being omitted or not sectioned therein in order to prevent crowding of the drawings and clouding the disclosure by showing unnecessary details of conventional constructions.

Figure 1:
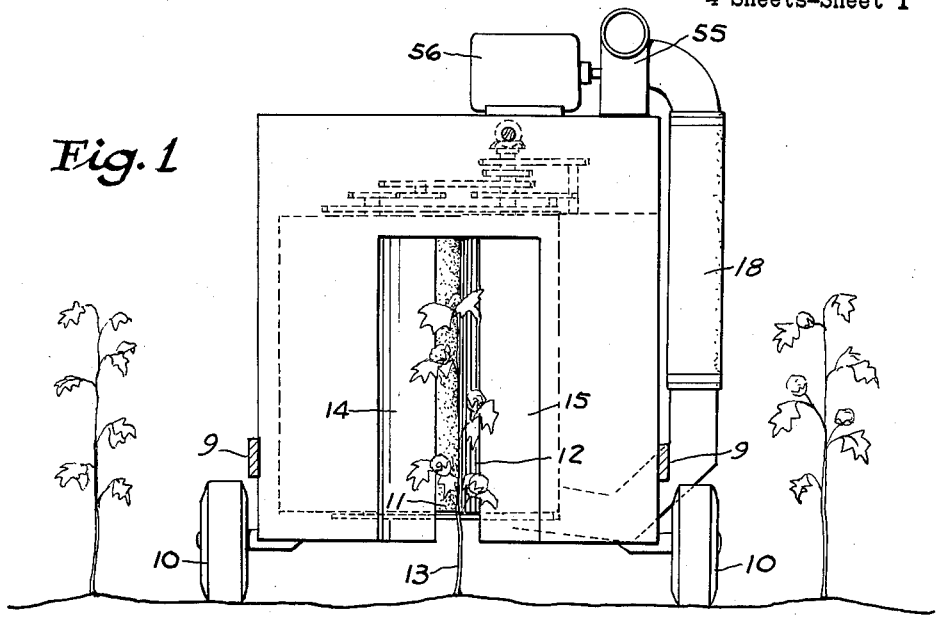
FIG. 1 is a front elevational view, with parts broken away and shown in section, of the cotton picker embodying the present invention.
Figure 2:
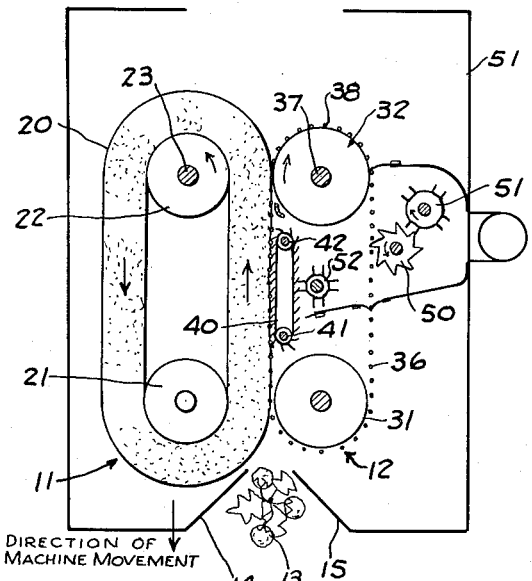
FIG. 2 is a diagrammatic top view, partly in section, of the cotton picker shown in FIG. 1.

In the drawings there is shown, by way of example, an improved cotton picker or cotton picking machine embodying the present invention. Referring specifically to the drawings, the cotton picker illustrated therein is made in the form of an attachment having wheels 10 and adapted to be drawn through the cotton field with the aid of a tractor or in any other suitable manner. The boll feeding unit generally designated by the numeral 11 and the fiber separating unit generally designated by the numeral 12 are operatively mounted on a suitable frame 9 supported by said wheels 10. These units are adapted to receive the row of cotton plants, such as indicated at 13, between them as the cotton picker is moved through the field. Sheet metal shields, such as 14 and 15, are provided in front of the cotton picker to direct the cotton plants into the space between the boll feeding unit 11 and fiber separating unit 12.

The boll feeding unit 11 comprises an endless connector, such as a belt 20, having an outside surface of sponge-like material, such as foam rubber or other rubber-like material, and having a substantial thickness, such as 4". The belt 20 is mounted on pulley-like members or drums 21 and 22 mounted on vertical shafts. The rear drum 22 is the driving drum, and its shaft 23 has a suitable connection with the wheels of the cotton picker in order to drive the belt 20 in the direction indicated by the arrows at a surface speed substantially equal and opposite to the forward bodily movement of the cotton picker.

Figure 7:
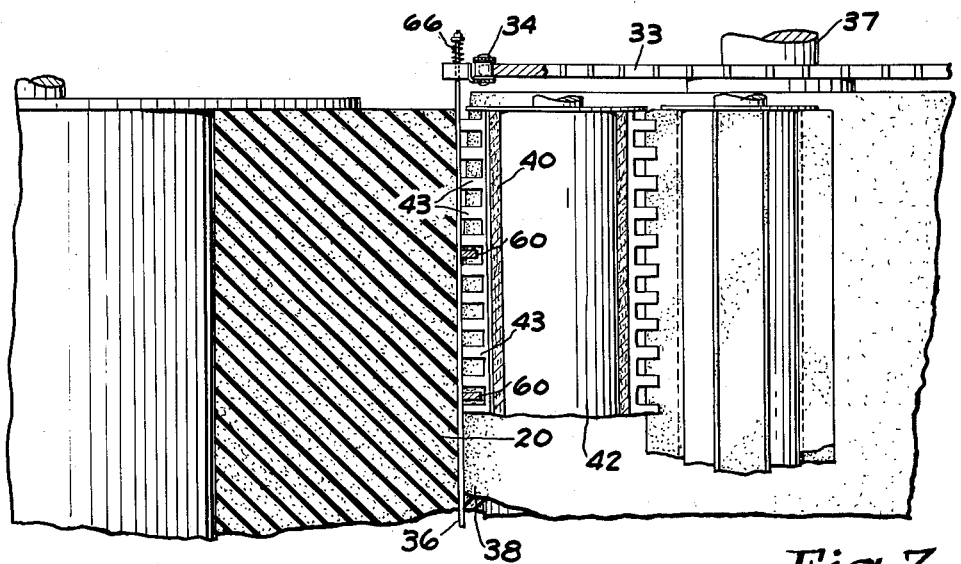
FIG. 7 is a fragmentary sectional view on an enlarged scale taken in the direction of the arrows on the section plane passing through the line 7—7 of FIG. 6.
Figure 8:
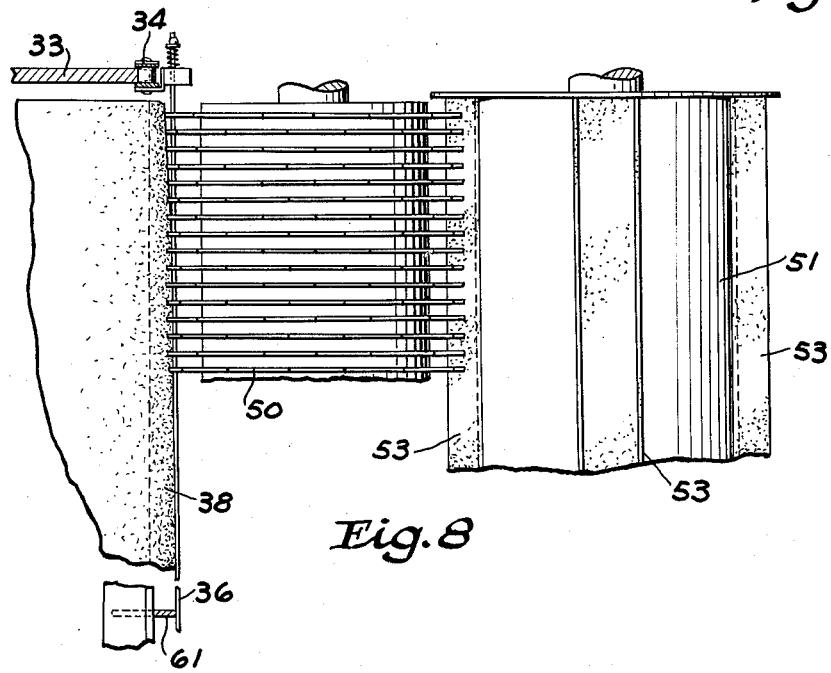
FIG. 8 is a fragmentary sectional view taken in the direction of the arrows on the section plane passing through the line 8—8 of FIG. 6.
Figure 9:
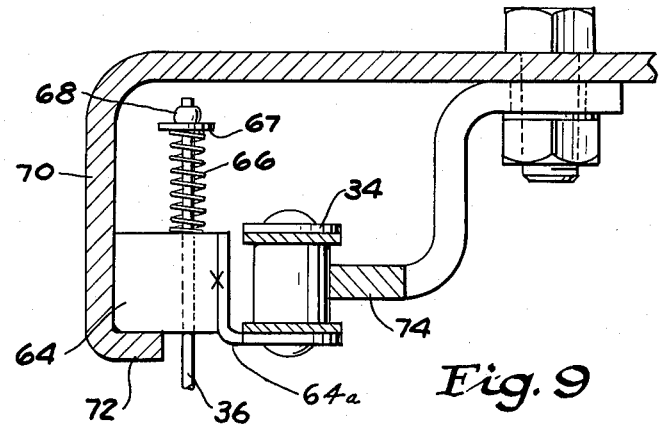
FIG. 9 is a fragmentary sectional view showing upper chain supporting track.
Figure 10:
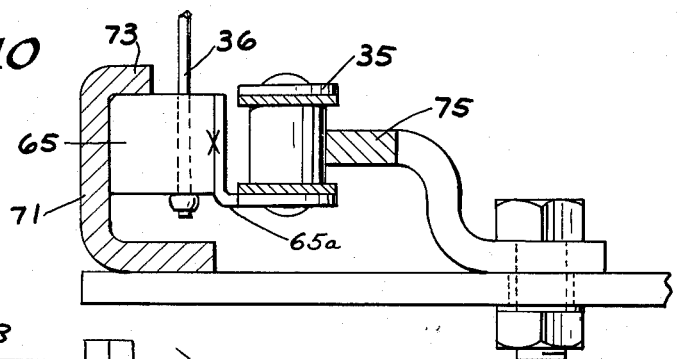
FIG. 10 is a fragmentary sectional view showing the lower chain supporting track.

The cotton fibers separating unit comprises two pulley-like or drum members 31 and 32 each having at its top and bottom a sprocket wheel such as wheel 33, see FIG. 7. Two endless chains, the upper chain 34 and the lower chain 35 are mounted on said sprocket wheels. A plurality of wires 36 are strung between the chains 34 and 35 and connected thereto in a manner hereinafter explained in detail. The wires 36 extend vertically between said chains and are arranged approximately one inch apart. By virtue of such a construction, the chains and the wires strung between them form, in effect, an endless belt somewhat similar to the belt 20 and running over the drums 31 and 32. The drum 32 is the driving drum, and its shaft 37 is drivingly connected to the wheels of the cotton picker similarly to the shaft 23 of the drum 22 and is driven at a surface speed substantially equal to the surface speed of the foam rubber belt 20, which speed, in turn, is substantially equal and opposite to the forward bodily movement of the cotton picker, as mentioned.

For the purposes of a better understanding of the inventive concept of my improved cotton picker, particularly in the mode of separation of the cotton fibers from the cotton plant, it will now be understood that as the cotton plant gets between the resilient sponge rubber surface of the belt 20 and the wires 36, the sponge rubber will push the cotton bolls partly through the wires. It is important, however, to appreciate that since the cotton picker moves forwardly and the rubber belt 20 and the wires 36 move rearwardly at the same speed, the above described engagement of the cotton plant would be similar to taking hold of it between the palms of two hands but without moving it forwardly or rearwardly. This condition is similar to what takes place in the cotton picker disclosed in my said co-pending application. The next problem and, therefore, the function of the means disclosed below is to take hold of or to pinch the cotton fibers in a sufficiently secure manner and to exert a pull thereon sufficient to separate the fibers from their hulls.

The means performing the function of taking hold of the cotton fibers are in the form of two expedients, with the first of said expedients adapted to comb or fold the cotton fibers over the wires, i.e. to comb such fibers in a forward direction on the inside of the wires, while actual engagement of the fibers is performed by the surface of the drum 32 against which the wires press tightly, thus pinching the cotton fibers between the wires 36 and the surface 38 of said drum.

The comb means are exemplified by an endless belt 40 running over the pulleys 41 and 42, of which the pulley 42 is the driving pulley. The surface of the belt 41 carries a plurality of comb tooth elements preferably in the form of sheet metal teeth 43 riveted or otherwise secured to the surface of the belt 40. It is important to appreciate that the belt 40 is driven in such a manner and at a surface speed to have the comb teeth 43 move in a forward direction, i.e. in the direction of the cotton picker travel, relatively to the wires 36. Such relative movement of the comb teeth 43 may be attained by running the belt 40 in the same direction with the wires 36 but at a slower speed, by holding it stationary, or by running it in the opposite direction to the movement of said wires. In the present embodiment of the invention the belt 40 is driven in the same direction as the wires 36 but at a slower speed, thus making it possible to clean the teeth 43 when they come to the other side of the belt, i.e. away from the wires 36.

It will now be understood in view of the foregoing that with the cotton bolls being pushed by the sponge rubber surface of the belt 20 partly through the wires 36, the comb teeth 43 of the moving belt 40 comb the cotton fibers forwardly, thus, in effect, bending them over the wires 36. In such condition the cotton bolls continue to move toward the separating drum 32, or to be more precise the separating drum 32 moving forwardly with the cotton picker reaches such cotton bolls. As the wires 36 reach the surface of the separating drum 32, which surface is preferably covered with polyurethane, the cotton fibers combed over such wires are thus becoming pinched between the wires and the foam polyurethane covered surface of the separating drum. I prefer to make the surface of the separating drum 32 not cylindrical but of a barrel-like form, i.e. to have greater diameter in the middle than at the ends of the drum. By virtue of such a construction, the wires 36 reaching the surface of the separating drum 32 are made to press tightly against such surface and, therefore, to hold such combed-over cotton fibers in a secure manner.

As the wires 36 move around on the drum 32, they acquire relative movement in the direction transverse to the row of the cotton plants. Since the plant being rooted in the ground remains stationary, the wires 36 pull on the combed-over cotton fibers which are, in effect, the end portions of the cotton flocks contained in the hulls. The wires 36 thus operate to pull such flocks of cotton fibers out of their hulls and to carry them to the other side of the drum where they fall down from the wires 36 either by themselves or are knocked off with the aid of a doffer roll 50.

I prefer to make such doffer roll in the form of a shaft on which there is mounted a plurality of rubber discs having teeth around their periphery similarly to circular saw blades. Spacers of a desired thickness may be interposed between such discs in order to space their teeth apart and thus to improve operation of the doffer roll.

A doffer cleaning roll 51 and a comb belt cleaning roll 52 are provided in order to knock off from the doffer roll 50 and from the comb teeth 43, respectively, cotton fibers that may remain thereon. The cleaning roll 51 comprises elongated drum on which there are mounted rubber channels 53. The cleaning roll 52 has a similar construction. The cotton separated from the wires 36 is removed through a conduit, such as indicated at 18, into a suitable container, preferably by suction produced by a blower, such as the one designated by the numeral 55, see FIG. 1, and operated with the aid of suitable driving means. Cotton fibers separated by the cleaning rolls 51 and 52 are similarly removed, additional air conduits being provided for such purpose.

Figure 6:
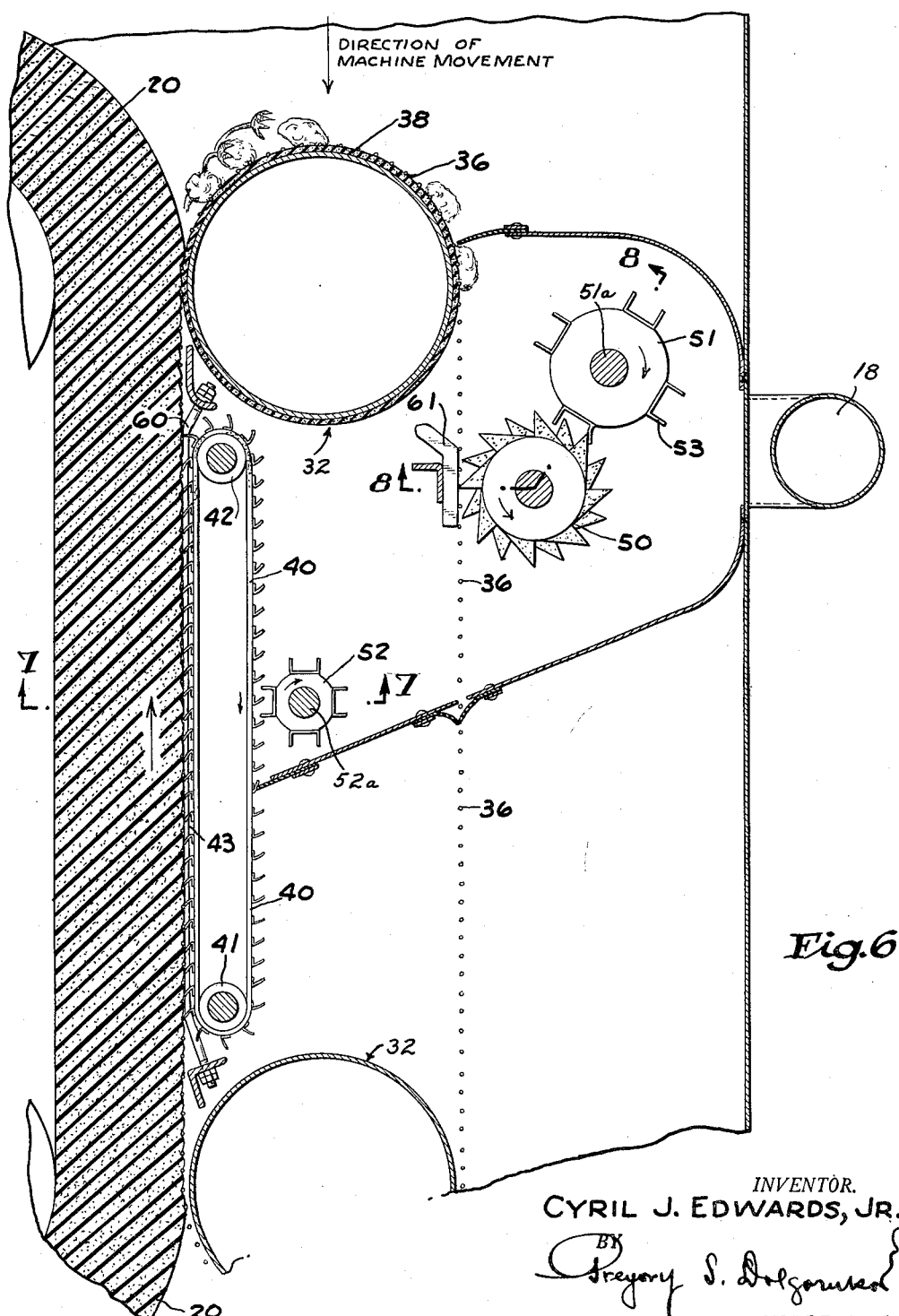
FIG. 6 is a top view with parts broken away and shown in section, said view illustrating on an enlarged scale cooperation of the cotton boll feeding unit and the cotton fiber separating unit, as well as of the means associated therewith.

Means are provided to support the wires 36 at the belt 20 in order to prevent said belt from pressing such wires too far inwardly and thus to cause the comb teeth 43 to catch on the wires 36. In the present embodiment of the invention, such means are exemplified by a plurality of elongated strips 60 provided on the side of the wires away from the belt 20 and running through the entire length of the belt 40, as is best shown in FIG. 6. Such strips run horizontally and are spaced approximately six inches apart. The comb teeth are removed in such places on the comb belt 40 in order to clear said wire supporting strips 60. In operation, wires 36 slide over the surfaces of such supporting strips 60. The strips 60 are fixed in any suitable manner on the frame of the cotton picker.

Means are provided to support wires 36 also on the other side of the drums 31 and 32, in the place where such wires are operated upon by the doffer roll or drum 50. Such support is in the form of an elongated curved strip or shoe 61 supporting the wires 36 at their middle as they slide over said strip.

Means are also provided to resist the tension of the wires 36 on chains 34 and 35, particularly in places where such chains run along straight lines, i.e. between the drums 31 and 32, where the pull of the wires 36 is not resisted by the sprocket wheels. In the present embodiment of the invention such means are exemplified by blocks 64 and 65 secured with the aid of suitable brackets 64a and 65a to the chains 34 and 35, respectively. The ends of the wires 36 are anchored in such blocks 64 and 65, as shown, with a compression spring 66 being provided at the upper ends of the wires 36 between the blocks 64 and washers 67. The washers 67 are held between the spring 66 and thickened end 68 of the wires 36, thus providing for resilient stringing of the wires. Such suspension of the wires is advantageous when said wires go over the barrel surface of the separating drum 32 as well as when sharp impacts are delivered to the wires, a condition unavoidable in operation of a machine of this nature in the field.

The blocks 64 and 65 run in the channel members 70 and 71. The downward movement of the block 64 or the upper movement of the block 65 is resisted by the horizontally extending flanges 72 and 73, respectively. In order to prevent said blocks from getting off their flanges because of the action of the belt 20, retainer brackets or rubbing strips 74 and 75 are provided on the opposite side of the chains 34 and 35 to resist such tendency.

Figure 11:
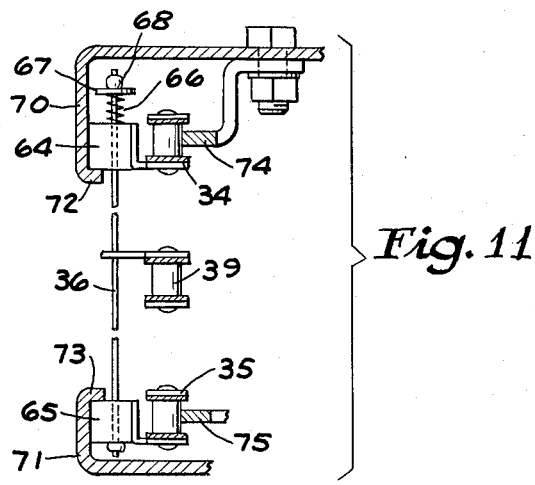
FIG. 11 is a fragmentary elevational view illustrating arrangement of a supplemental driving chain.

For use in locations where cotton plants grow particularly high and, therefore, require higher drums, a wider belt, and longer wires, it may be desirable to provide intermediately chains 34 and 35 an additional chain, such as the one designated by the numeral 39 in FIG. 11, to exert pull on the wires such as 36, intermediately of their ends; an intermediate chain may be made considerably lighter than the chains 34 and 35. Additional sprocket wheels for the chain 39 should be provided on the drums 31 and 32.

Figure 3:
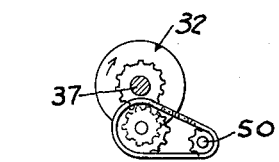
FIG. 3 is a fragmentary diagrammatic top view, with parts broken away and shown in section, of the driving connection between the shaft of the separating drum and the doffer roll.
Figure 4:
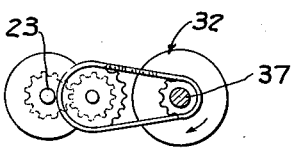
FIG. 4 is a fragmentary top view, with parts broken away and shown in section, of the driving connection between the shaft of the separating drum and the shaft of the drum driving the cotton feeding belt.
Figure 5:
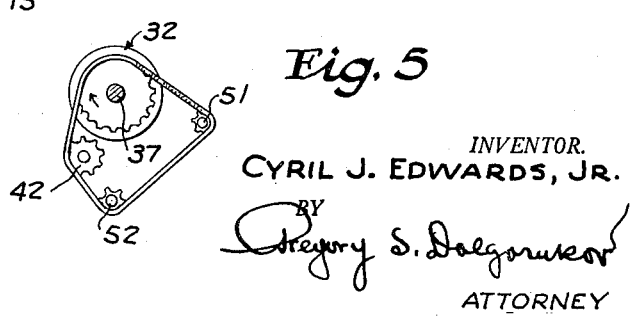
FIG. 5 is a fragmentary top view, with parts broken away and shown in section, of the driving connection between the shaft of the separating drum and the comb belt driving pulley, and the cleaning rolls.

FIGS. 3, 4 and 5 illustrate driving connections operating various rolls. In the present embodiment of the invention such driving connections are produced by connecting various service rolls, such as the doffer roll and the cleaning rolls, to the drive shaft 37 of the separating drum 32, in a manner illustrated in said figures.

By virtue of the above disclosed construction, the objects of the present invention listed above and numerous additional advantages are attained.

I claim:

1. In a cotton picker, a cotton boll feeding unit adapted to engage cotton bolls and move them into contact with a cotton fibers separating unit, and a cotton fibers separating unit arranged adjacently said boll feeding unit to have a row of cotton plants pass between said units as the cotton picker is being moved along such row, said cotton fibers separating unit being adapted to engage the cotton fibers and separate them from their bolls, said boll feeding unit including a single endless connector having a resilient surface of substantial thickness adapted to push cotton bolls toward and against said fibers separating unit.

2. The invention defined in claim 1, with said endless connector being in the form of a belt made of sponge rubber-like material, approximately 4" thick.

3. In a cotton picker, a cotton boll feeding unit adapted to engage cotton bolls and move them into contact with a cotton fibers separating unit, and a cotton fibers separating unit arranged adjacently said boll feeding unit to have a row of cotton plants pass between said units when the cotton picker is moved along such row, said cotton fibers separating unit being adapted to engage the cotton fibers and separate them from their bolls, said boll feeding unit including two pulley-like members mounted on the structure of the cotton picker, to rotate around vertical axes, an endless connector having a resilient surface and mounted on said pulley-like members so as to operate at such an angular speed that the surface speed of such connector is substantially equal to the linear speed of the cotton picker travel but is directed rearwardly.

4. In a cotton picker, a fibers separating unit adapted to engage cotton fibers of the cotton bolls brought in contact therewith, said separating unit comprising two endless conductors, pulley-like members having connector-engaging members provided at the top and bottom thereof on which said connectors are mounted, a plurality of tightly strung wires extending between said connectors, said connectors being adapted to run on said connector-engaging members at a surface speed substantially equal to the linear speed of the cotton picker travel but directed rearwardly, and comb means operatively associated with said wires and provided within the space surrounded by said connectors and said wires and adapted to fold the cotton fibers over said wires as they pass by said comb means.

5. In a cotton picker, a fibers separating unit adapted to engage cotton fibers of the cotton bolls brought in contact therewith, said separating unit comprising two endless connectors, pulley-like members having connector-engaging members provided at the top and bottom thereof on which said connectors are mounted, a plurality of tightly strung wires extending between said connectors, said connectors being adapted at their portions engaging the cotton bolls to run in the rearward direction at a surface speed substantially equal to the linear speed of the cotton picker travel, and a comb belt operatively associated with said wires and provided within the space surrounded by said connectors and said wires and adapted to run in a manner to have a relative movement of the comb elements forwardly of the cotton picker with respect to the wires in order to fold the cotton fibers over said wires.

6. The invention defined in claim 5 and including a rotatable rubber member operatively associated with said belt and adapted to clean the cotton from the comb belt.

7. In a cotton picker, a fibers separating unit adapted to engage cotton fibers of the cotton bolls brought in contact therewith, said separating unit comprising two endless connectors, pulley-like members having said connectors disposed thereon at the top and bottom thereof, a plurality of tightly strung wires extending between said connectors, said connectors being adapted at their adjacent sides to run in the rearward direction over said pulley-like members at a surface speed substantially equal to the linear speed of the cotton picker travel, comb means operatively associated with said wires and provided within the space circumscribed by said connectors and said wires and adapted to fold the cotton fibers over said wires, as they pass by said comb means, for engagement of the cotton fibers by said wires and subsequent separation of said fibers as the wires run over the rear pulley-like member, and rotatable means operatively associated with said wires and adapted to doff from said wires the separated cotton fibers carried thereby.

8. In a cotton picker, a fibers separating unit adapted to engage cotton fibers of the cotton bolls brought in contact therewith, said separating unit comprising two endless connectors, pulley-like members having said connectors disposed thereon at the top and bottom thereof, a plurality of tightly strung wires extending between said connectors, said connectors being adapted at their adjacent sides to run in the rearward direction over said pulley-like members at a surface speed substantially equal to the linear speed of the cotton picker travel, comb means operatively associated with said wires and provided within the space encircled by said connectors and said wires and adapted to fold the cotton fibers over said wires as they pass by said comb means for separation of said fibers as the wires run over the rear pulley-like member, a rotatable drum operatively associated with said wires and adapted to doff from said wires the separated cotton fibers carried thereby, means operatively associated with said drum and adapted to clean said rotatable drum, a container for cotton fibers, and means operatively associated with said container and said drum for conveying the collected cotton fibers as well as cotton fibers removed from said rotatable drum and said means into said container.

9. In a cotton picker, a cotton boll feeding unit adapted to engage cotton bolls and move them into contact with a cotton fibers separating unit, said unit including two pulley-like members rotatable around two fixed vertical axes and an endless belt of sponge-like material having a substantial thickness and resilient surface, said belt being mounted on said pulley-like members, a fibers-separating unit adapted to engage cotton fibers of the cotton bolls brought in contact therewith, said separating unit arranged adjacently said belt and including two members rotatable around vertical axes, two sprocket wheels provided on each of said last members at the top and bottom thereof, two chains mounted on said sprocket wheel and driven thereby, a plurality of vertically extending wires strung between said two chains, said belt and said chains being disposed so that the resilient surface of said belt substantially touches said wires, said belt surface and said wires being adapted to retain cotton plants between them as the cotton picker moves in the field, driving means for said belt and said chains for driving them at substantially the surface speed equal to the forward bodily movement of the cotton picker but directed rearwardly at the adjacent sides of the belt and the chains, and comb means provided adjacent said wires at said belt and adapted to comb the cotton fibers of the cotton boll over said wires toward the front of the cotton picker.

10. The invention defined in claim 9 and including a track operatively associated with each of said chains and adapted to resist the tension of the strung wires.

11. The invention defined in claim 9, with the wires being resiliently mounted at their ends.

12. The invention defined in claim 9, with the wires being resiliently mounted at their ends, and with the rear rotatable member of said fibers separating unit being in the form of a drum having greater diameter at its middle than at its ends in order to increase the tension of the wires as they pass over the surface thereof.

13. The invention defined in claim 9, and including elongated horizontal members provided within the space enclosed by the wires and adapted to support the wires as they are being pushed inwardly by the sponge belt.

References Cited in the file of this patent

UNITED STATES PATENTS

| | | |
|---|---|---|
| 1,646,594 | Phelps et al. | Oct. 25, 1927 |
| 2,200,464 | Berry | May 14, 1940 |
| 2,402,201 | Martin | June 18, 1946 |
| 2,815,635 | Shannon | Dec. 10, 1957 |